US012506312B2

(12) United States Patent
Tan

(10) Patent No.: US 12,506,312 B2
(45) Date of Patent: Dec. 23, 2025

(54) CONNECTOR, A DATA WIRE AND AN ELECTRONIC DEVICE

(71) Applicant: DONGGUAN YUANCHUANG ELECTRONIC TECHNOLOGY CO., LTD., Dongguan (CN)

(72) Inventor: Hongping Tan, Dongguan (CN)

(73) Assignee: DONGGUAN YUANCHUANG ELECTRONIC TECHNOLOGY CO., LTD., Dongguan (CN)

( * ) Notice: Subject to any disclaimer, the term of this patent is extended or adjusted under 35 U.S.C. 154(b) by 730 days.

(21) Appl. No.: 17/732,527

(22) Filed: Apr. 29, 2022

(65) Prior Publication Data

US 2022/0352683 A1 Nov. 3, 2022

(30) Foreign Application Priority Data

Apr. 30, 2021 (CN) ........................ 202120939569.X
Dec. 8, 2021 (CN) ........................ 202123086559.5
Dec. 8, 2021 (CN) ........................ 202123087424.0

(51) Int. Cl.
*H01R 35/04* (2006.01)
*H01R 13/62* (2006.01)
*H01R 31/06* (2006.01)
*H01R 107/00* (2006.01)

(52) U.S. Cl.
CPC ......... *H01R 35/04* (2013.01); *H01R 13/6205* (2013.01); *H01R 31/06* (2013.01); *H01R 2107/00* (2013.01)

(58) Field of Classification Search
CPC .... H01R 35/04; H01R 13/6205; H01R 31/06; H01R 2107/00; A24F 40/65; A24F 40/40; H04R 1/1016; H04R 1/1033; Y02E 60/10
USPC ........................................................... 439/13
See application file for complete search history.

(56) References Cited

U.S. PATENT DOCUMENTS

2021/0066829 A1* 3/2021 Tan ........................ H01R 12/71

FOREIGN PATENT DOCUMENTS

| | | |
|---|---|---|
| CN | 211456175 U | 9/2020 |
| CN | 211829239 U | 10/2020 |
| CN | 214542841 U | 10/2021 |
| CN | 214542842 U | 10/2021 |

* cited by examiner

*Primary Examiner* — Tulsidas C Patel
*Assistant Examiner* — Jeffrey Mountain
(74) *Attorney, Agent, or Firm* — Andrew C. Cheng

(57) ABSTRACT

The present disclosure relates to the technical field of electronic device accessories, more particularly to a connector, a data wire and an electronic device. The connector includes a first electrical connecting structure including a connecting base and an adapter board disposed thereon, and a second electrical connecting structure including a fixing base and a conductive member that are rotatably connected. The fixing base forms a clamping groove for the adapter board to be inserted into, and the conductive member is fixed in the fixing base and exposed from the clamping groove. The connecting base further includes a splint which includes portions respectively disposed on both sides of the adapter board in the thickness direction thereof, and is disposed on the outer side of the fixing base, so that the outer side thereof is the structure of the fixing base and the splint in sequence.

16 Claims, 12 Drawing Sheets

CONNECTOR, A DATA WIRE AND AN ELECTRONIC DEVICE

TECHNICAL FIELD

The present disclosure relates to the technical field of electronic device accessories, and more particularly to a connector, a data wire and an electronic device.

BACKGROUND

With the diversification of the types of electronic products, such as electronic cigarettes, TWS earphones, mobile phones, etc., these portable electronic products have become products that users always carry with them. In order to be used at any time, a timely charging when there is no power is needed. Meanwhile, the specific usage scenarios are also diverse when charging. Therefore, a data wire with a rotating function is provided. However, current data wires with rotating functions have technical problems such as unreasonable structural design, insufficient strength, easy to be broken during use, which affect the lifetime of the data wires.

SUMMARY

In order to overcome the defect of insufficient strength due to unreasonable structural design of the current connectors, the present disclosure provides a connector, a data wire and an electronic device.

According to one embodiment, the present disclosure provides a connector which includes a first electrical connecting structure and a second electrical connecting structure. The first electrical connecting structure includes a connecting base and an adapter board disposed on the connecting base. The second electrical connecting structure includes a fixing base and a conductive member. The fixing base forms a clamping groove for the adapter board to be inserted into. The conductive member is fixed in the fixing base and exposed from the clamping groove to be electrically connected to the adapter board. The connecting base further includes a splint which includes portions respectively disposed on both sides of the adapter board in the thickness direction thereof. The first electrical connecting structure and the second electrical connecting structure are rotatably connected.

Preferably, the connector further includes a connecting shaft, and the connecting shaft connects the splint and the fixing base on one side and the splint and the fixing base on the other side. Or the connecting shaft connects the fixing base and the adapter board. Or the connecting shaft connects the splint on both sides, the fixing base and the adapter board. The first electrical connecting structure and the second electrical connecting structure are rotatably connected via the connecting shaft.

Preferably, the connecting shaft passes through the fixing base and the adapter board and connects to the splint on two sides of the fixing base.

Preferably, the splint is provided in two pieces, which are oppositely disposed on both sides of the adapter board in the thickness direction thereof. The two pieces of splints form a discontinuous gap for the second electrical connecting structure to be rotatably connected. The two pieces of splints and the adapter board form a cavity for accommodating the fixing base, and the cavity is communicated with the gap.

Preferably, the fixing base includes a first fixing base and a second fixing base located on two sides of the clamping groove. The cavity includes a first cavity located between one splint and the adapter board and a second cavity located between the other splint and the adapter board. The first fixing base and the second fixing base are respectively accommodated in the first cavity and the second cavity.

Preferably, the outer surface of the fixing base facing the splint is flat. The inner surface of the splints facing the fixing base is accordingly flat. The outer surface of the fixing base is in close contact with the inner surface of the splint.

Preferably, a contact circuit is provided on the adapter board. The contact circuit and the adapter board respectively include arc structures. The conductive members are rotatably connected to the contact circuit.

Preferably, the rotation angle of the first electrical connecting structure and the second electrical connecting structure ranges from 0 to 180 degrees.

Preferably, the conductive member is disposed on opposite sides of the clamping groove. The contact circuit is disposed on opposite surfaces of the adapter board.

Preferably, one of the first electrical connecting structure and the second electrical connecting structure is used for connecting with a wire body, and the other is a magnetic attraction connector structure or a fixed connector structure. Or, both of the first electrical connecting structure and the second electrical connecting structure are used to connect with the wire body. Or, the first electrical connecting structure and the second electrical connecting structure are one or both of a magnetic attraction connector structure or a fixed connector structure.

Preferably, the first electrical connecting structure is used for electrical connection with a wire body, the second electrical connecting structure is a magnetic attraction connector structure. The second electrical connecting structure further includes top pins electrically connected to the conductive member and an annular magnetic member disposed on outer side of the top pins.

Preferably, the number of the top pins is 9, including a first top pin, two second top pins, two third top pins, two fourth top pins and two fifth top pins. The second top pins, the third top pins, the fourth top pins and the fifth top pins are respectively and symmetrically disposed on both sides of the first top pin.

Preferably, the electrical signal of the magnetic member is defined as the "CC1" fast charge signal, and the electrical signals of the first top pin, the second top pins, the third top pins, the fourth top pins and the fifth top pin are respectively defined as "D−", "CC2", "V+", "D+" and "G". Or the electrical signal of the magnetic member is defined as the "CC2" fast charge signal, and the electrical signals of the first top pin, the second top pins, the third top pins, the fourth top pins and the fifth top pins are respectively defined as "D−", "CC1", "V+", "D+" and "G".

Preferably, the first electrical connecting structure is used for electrically connecting with a wire body, and the second electrical connecting structure is a magnetic attraction connector structure. The second electrical connecting structure further includes conductive pins, a plug board, and an annular magnetic member disposed on outer side of the plug board. The conductive pins are disposed on both sides of the plug board, and the conductive pins are electrically connected with the conductive members.

In order to solve the above technical problems, accordingly to another embodiment, the present disclosure further provides a data wire, and the data wire includes a wire body and the above-mentioned connector. The wire body is electrically connected to one or both of the first electrical connecting structure and the second electrical connecting structure.

In order to solve the above technical problems, still accordingly to another embodiment, the present disclosure further provides an electronic device, the electronic device includes a main body and the above-mentioned data wire, and the main body is electrically connected to the data wire.

Compared with the prior art, the connector, the data wire and the electronic device of the present disclosure have the following beneficial effects.

A connector, including a first electrical connecting structure and a second electrical connecting structure. The first electrical connecting structure includes a connecting base and an adapter board disposed on the connecting base. The second electrical connecting structure includes a fixing base and a conductive member. The fixing base forms a clamping groove for the adapter board to be inserted into. The conductive member is fixed in the fixing base and exposed from the clamping groove to be electrically connected to the adapter board. The connecting base further includes a splint which includes portions respectively disposed on both sides of the adapter board in the thickness direction thereof. The first electrical connecting structure and the second electrical connecting structure are rotatably connected. The splint is disposed on both sides of the adapter board in the thickness direction thereof to protect the adapter board, so that the first electrical connecting structure and the second electrical connecting structure are rotatably connected, when subjected to a force along the thickness direction of the adapter board, the dislocation and deflection of the adapter board along the thickness direction can be avoided, reducing the risk of the adapter board being broken.

The splint is provided in two pieces, which are oppositely disposed on both sides of the adapter board in the thickness direction thereof. The two pieces of the splint form a discontinuous gap for the second electrical connecting structure to be rotatably connected. The two pieces of the splint and the adapter board form a cavity for accommodating the fixing base, a portion of the cavity is formed between each piece of the splint and the adapter board, and the portions of the fixing base on both sides of the clamping groove are respectively accommodated in the corresponding cavity, forming a clamping structure in which the fixing base is clamped between the two pieces of the splint. Thus the splint can well protect the adapter board, and can well reduce the risk of the adapter board being broken when subjected to a force along the thickness direction thereof. Meanwhile, the splint is added to be disposed on outer side of the fixing base, and the two are connected through the connecting shaft, so that the outer side of the adapter board is the structure of the fixing base and the splint in sequence, which enhances the connection strength between the first electrical connecting structure and the second electrical connecting structure and improves the lifetime thereof.

The adapter board and the fixing base are arranged in a flat shape and in close contact with each other, which can improve the tightness of the first electrical connecting structure and the second electrical connecting structure and reduce the volume of the connector.

One of the first electrical connecting structure and the second electrical connecting structure is used for connecting with a wire body, and the other is a magnetic attraction connector structure or a fixed connector structure. Or, both of the first electrical connecting structure and the second electrical connecting structure are used to connect with the wire body. Or, the first electrical connecting structure and the second electrical connecting structure are one or both of a magnetic attraction connector structure or a fixed connector structure, which diversifies the connector to meet the needs of different practical scenarios.

The data wire and the electronic device of the present disclosure have the same beneficial effects as the connector.

NUMERICAL REFERENCE IDENTIFICATION

Figure 1:
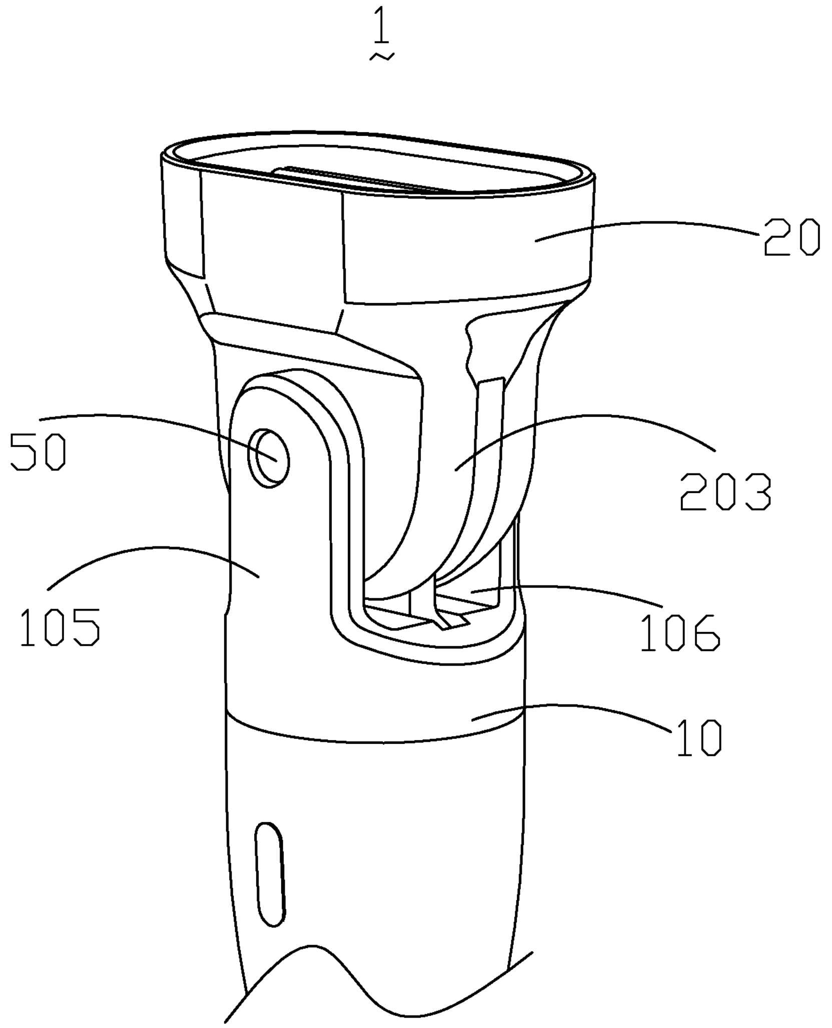
FIG. 1 is a perspective view of a connector according to a first embodiment of the present disclosure.

1. connector; 10. first electrical connecting structure; 101. adapter board; 1011. contact circuit; 103. connecting base; 1031. main body; 105. splint; 106. cavity; 1061. first cavity; 1062. second cavity; 107. wire body; 20. second electrical connecting structure; 201. conductive member; 203. fixing base; 2031. clamping groove; 2032. first fixing base; 2033. second fixing base; 205. plug board; 2051. conductive element; 206. PCB board; 207. magnetic member; 208. top pin; 2081. first top pin; 2082. second top pin; 2083. third top pin; 2084. fourth top pin; 2085. fifth top pin; 209. insulating member; 4. electronic device; 401. main body; 50. connecting shaft; 60. magnetic attraction plug; 601.

plug-in connector; 603. conductive pin; 604. plug-in cavity; 8. data wire; 801. wire body.

DETAILED DESCRIPTION

In order to make the objectives, technical solutions, and advantages of the present disclosure clearer, the present disclosure is further described in detail below with reference to the accompanying drawings and embodiments. It should be understood that the specific embodiments described herein are provided for illustration only, and not for the purpose of limiting the disclosure.

It should be noted that, in the present disclosure, the terms “up”, “down”, “left”, “right”, “front”, “rear”, “top”, “bottom”, “inside”, “outside”, “middle”, “vertical”, “horizontal”, “longitudinal”, etc. are based on the orientations or positional relationships shown in the drawings. Terms herein are primarily used to better describe the disclosure and the embodiments, and are not intended to limit that the indicated device, element, or component must have a particular orientation, or be constructed and operated in a particular orientation.

In addition, some of the above-mentioned terms may be used to express other meanings besides orientation or positional relationship. For example, the term “on” may also be used to express a certain attachment or connection relationship in some cases. For those skilled in the art, the specific meanings of the above terms in the present disclosure can be understood according to specific situations.

Furthermore, the terms “install”, “arrange”, “provide”, “connect”, “contact” should be construed broadly. For example, it may be a fixed connection, a detachable connection, or an integral structure; it may be a mechanical connection, or an electrical connection; it may be directly connected, or indirectly connected through an intermediary, or an internal communication between two devices, elements, or components. For those skilled in the art, the specific meanings of the above terms in the present disclosure can be understood according to specific situations.

Referring to FIG. 1, FIG. 2, FIG. 3 and FIG. 4, a first embodiment of the present disclosure provides a connector 1, for charging electronic products or transmitting data. Electronic products include electronic cigarettes, TWS earphones, mobile phones, etc. The connector 1 includes a first electrical connecting structure 10, a second electrical connecting structure 20 and a connecting shaft 50, and the connecting shaft 50 is rotatably connected with the first electrical connecting structure 10 and the second electrical connecting structure 20. The first electrical connecting structure 10 includes an adapter board 101, the second electrical connecting structure 20 includes a conductive member 201, and the conductive member 201 is electrically connected to the adapter board 101.

Figure 4:
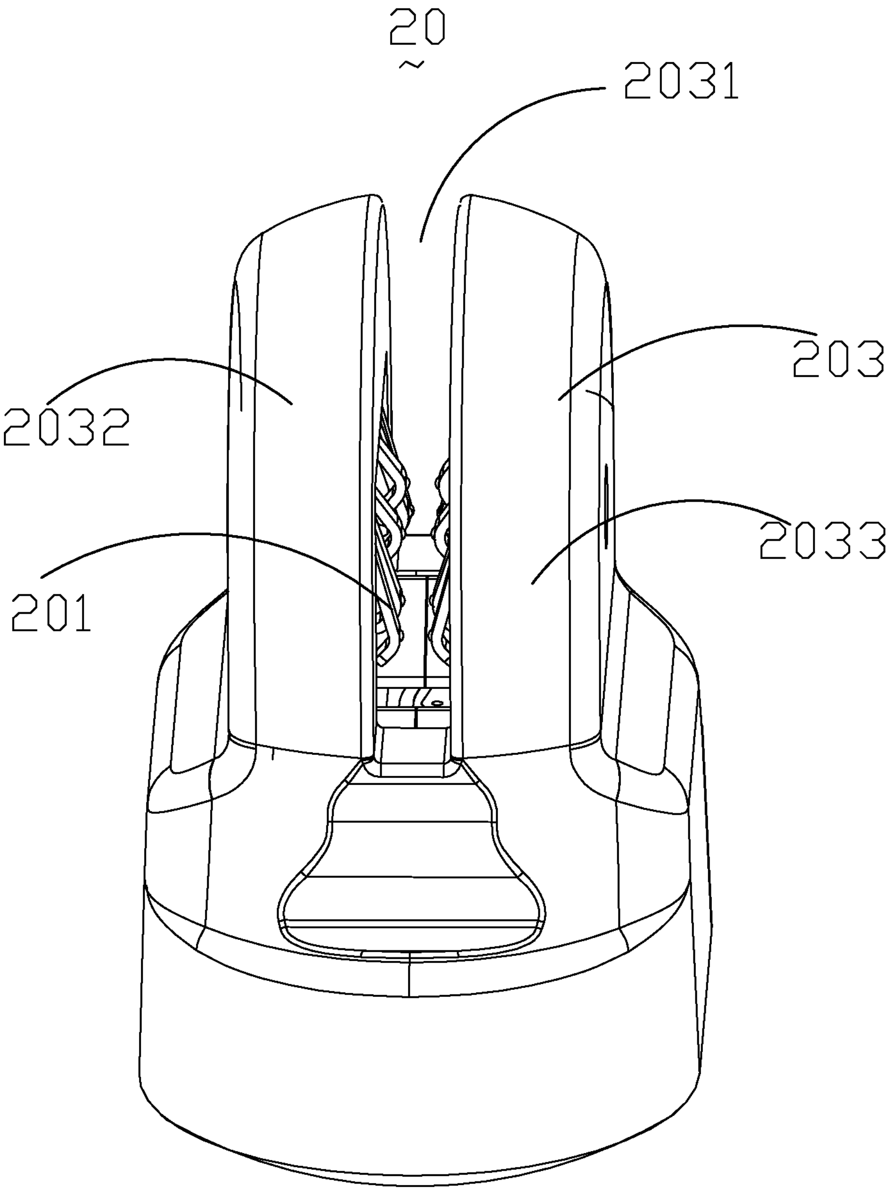
FIG. 4 is a perspective view of a second electrical connecting structure of the connector according to the first embodiment of the present disclosure.

Referring to FIG. 4, the second electrical connecting structure 20 further includes a fixing base 203, and the fixing base 203 is provided with a clamping groove 2031 for the adapter board 101 to be inserted into. The conductive member 201 is fixed in the fixing base 203 and exposed from the clamping groove 2031 to be in contact with the adapter board 101. The adapter board 101 is rotatably connected with the fixing base 203. The fixing base 203 includes a first fixing base 2032 and a second fixing base 2033 located on two sides of the clamping groove 2031.

Figure 2:
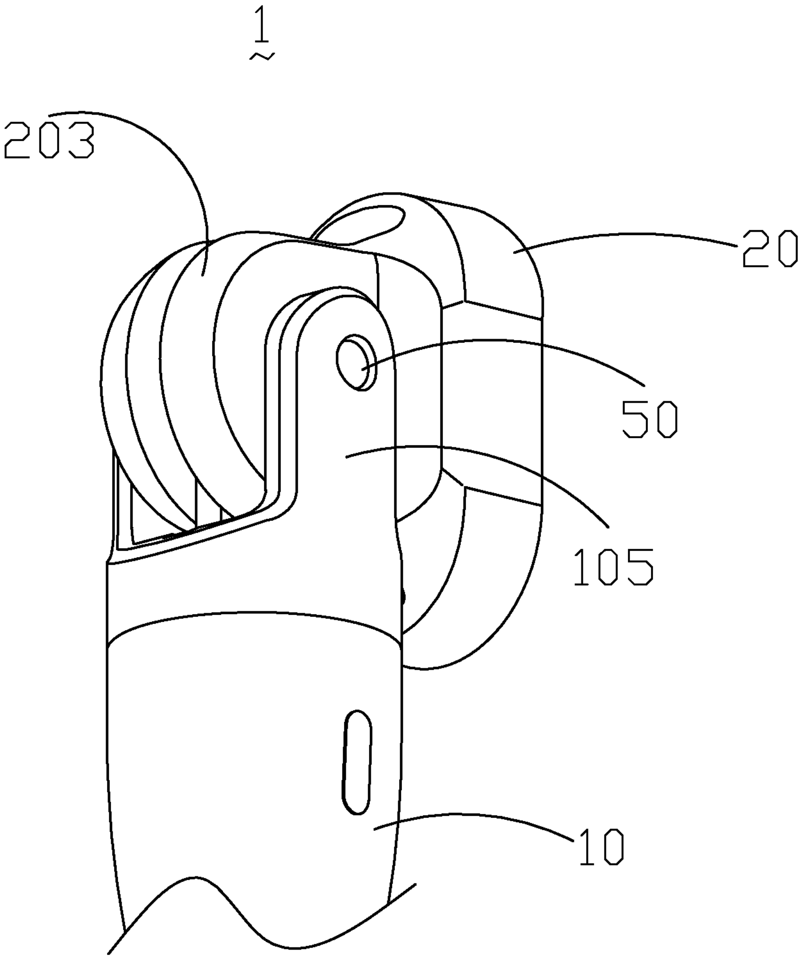
FIG. 2 is a perspective view of the connector under another angle according to the first embodiment of the present disclosure.

Referring to FIG. 1, FIG. 2 and FIG. 3 again, the first electrical connecting structure 10 further includes a connecting base 103, and the adapter board 101 is connected with the connecting base 103. The connecting base 103 is provided with a splint 105, and the splints 105 and the adapter board 101 extend toward the same side of the connecting base 103. The splint 105 includes portions respectively disposed on both sides of the adapter board 101 in the thickness direction thereof, and a cavity 106 for accommodating the fixing base 203 is formed between the splint 105 on both sides and the adapter board 101 respectively. The cavity 106 includes a first cavity 1061 located between one portion of the splint 105 and the adapter board 101 and a second cavity 1062 located between the other portion of the splint 105 and the adapter board 101. Referring to FIG. 2 together, the second electrical connecting structure 20 is partially accommodated in the cavity 106 and rotate relative to the splint 105. That is, the first fixing base 2032 and the second fixing base 2033 are respectively accommodated in the first cavity 1061 and the second cavity 1062. The connecting shaft 50 is connected to the splint 105, the fixing base 203 and the adapter board 101, so that the first electrical connecting structure 10 and the second electrical connecting structure 20 are rotatably connected.

Referring to FIG. 3 again, the connecting base 103 includes a main body 1031, and the main body 1031 is in the shape of an elongated column. The adapter board 101 and the splint 105 are disposed on one side of the main body 1031 in the length direction thereof. A portion of the adapter board 101 is fixed in the connecting base 103, and a portion thereof extends out of the connecting base 103 to be connected with the fixing base 203. The extension direction of the adapter board 101 is the same as the length direction of the main body 1031.

Optionally, the splint 105 extends a certain distance relative to the main body 1031. The splint 105 can be formed by integrally molding with the main body 1031 or the splint 105 can be detachably connected to a side of the main body 1031 which is close to the second electrical connecting structure 20.

In some specific embodiments, the splint 105 is provided in two separate portions, which are disposed oppositely, and the two oppositely disposed portions of the splint 105 and the adapter board 101 together form a cavity 106 for accommodating the second electrical connecting structure 20. The two portions of the splint 105 can be two independent pieces, or can be integrally formed. The second electrical connecting structure 20 is partially accommodated in the cavity 106 and rotates relative to the splint 105. That is, the first fixing base 2032 and the second fixing base 2033 are respectively accommodated in the first cavity 1061 and the second cavity 1062.

In order to prevent the splint 105 from hindering the rotation of the fixing base 203, the splint 105 is provided in two discontinuous pieces, which are respectively disposed on both sides of the splint 105 in the thickness direction thereof. A portion of the cavity 106 is formed between each splint 105 and the adapter board 101, and the portions of the fixing base 203 on both sides of the clamping groove 2031 are respectively accommodated in the corresponding cavity 106, forming a sandwich structure where the fixing base 203 is positioned between the two pieces of splints 105. Thus the splints 105 can well protect the adapter board 101, and reduce the risk of the adapter board 101 being broken when subjected to a force along the thickness direction thereof. Meanwhile, the splints 105 are disposed on outer side of the fixing base 203, so that the outer side of the adapter board 101 is the fixing base 203 and the splint 105 in sequence, which enhances the connection strength between the first electrical connecting structure 10 and the second electrical connecting structure 20 and improves the lifetime thereof.

The two pieces of splints 105 of this embodiment are only a form of realization, and may also be a cylindrical structure with the fixing base 203 accommodated therein. Or it may be other limiting structures, such as cylinders, claw structures, etc, as long as a corresponding cutout are provided to ensure the smooth rotation of the first electrical connecting structure 10 and the second electrical connecting structure 20.

Further, in order not to affect the rotation effect of the adapter board 101 relative to the fixing base 203, and meanwhile not to affect the limiting effect of the splint 105 relative to the fixing base 203, the connecting line of the two pieces of splints 105 and the axis of the rotating connection between the adapter board 101 and the fixing base 203 are parallel or coincident with each other.

It should also be noted that, the connecting shaft 50 is connected to the splints 105 and simultaneously passes through the fixing base 203 and the adapter board 101. Thus, the relative positions of the splint 105, the fixing base 203 and the adapter board 101 are fixed, and the splints 105 has a function of protection while avoiding a displacement between each other, which better reduces the risk of the adapter board 101 being broken.

In some other embodiments, the connecting shaft 50 is provided with two discontinuous portions, respectively connecting the splint 105 and the fixing base 203 on one side and connecting the splint 105 and the fixing base 203 on the other side. That is, the connecting shaft 50 is not connected to the adapter board 101. Thus the rotation of the splint 105 relative to the fixing base 203 drives the adapter board 101 to rotate relative to the conductive member 201, so as to rotatably and electrically connect therebetween. By rotatably connecting the connecting shaft 50 with the splint 105 and the fixing base 203 respectively, the fixing base 203 can be well positioned, thereby further avoiding a displacement of the fixing base 203 relative to the adapter board 101 to squeeze the adapter board 101.

Or, in some other embodiments, when the fixing base 203, the splint 105 and the adapter board 101 are disposed in close contact with each other, the tightness therebetween is high, reducing the possibility of displacement of the fixing base 203. In this case, the connecting shaft 50 is provided to connect the fixing base 203 and the adapter board 101 without connecting the splints 105, and the first electrical connecting structure 10 and the second electrical connecting structure 20 can be rotatably connected.

Figure 3:
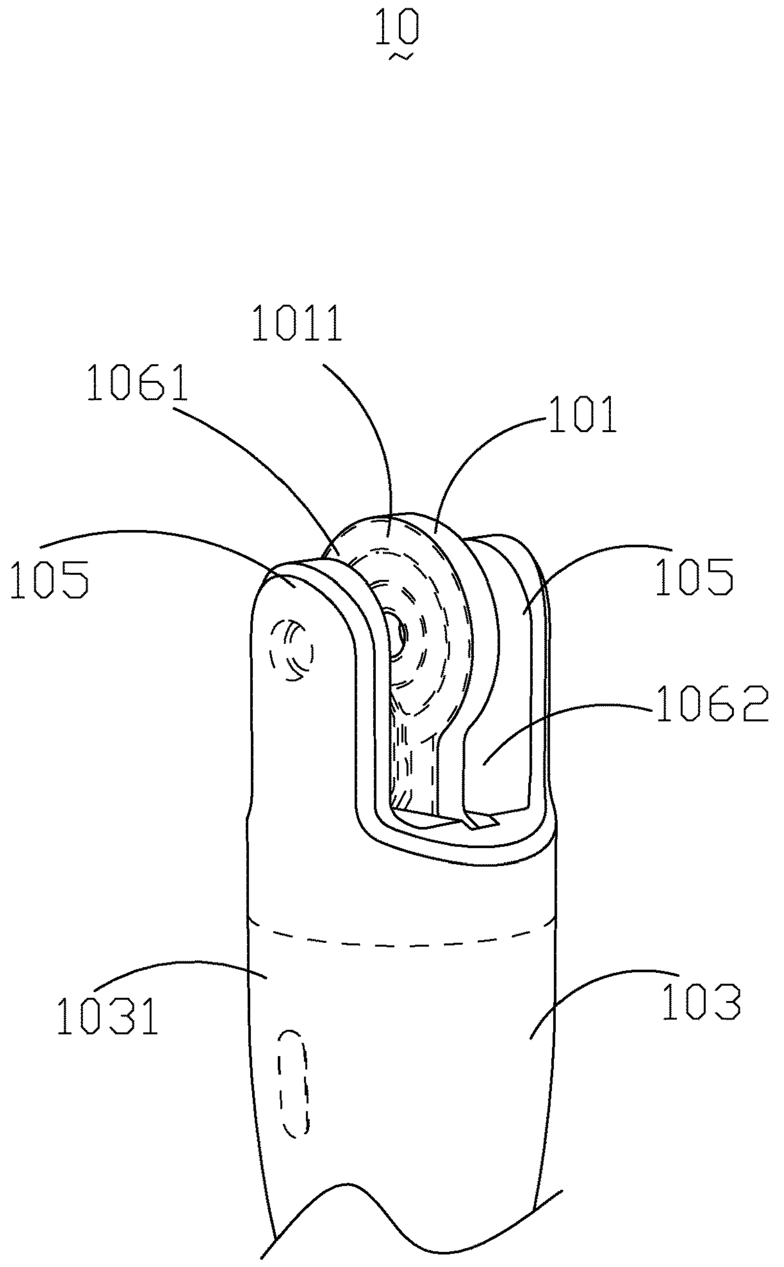
FIG. 3 is a perspective view of a first electrical connecting structure of the connector according to the first embodiment of the present disclosure.

Referring to FIG. 3 and FIG. 4 again, the outer surface of the fixing base 203 facing the splint 105 is flat, the inner surface of the splint 105 facing the fixing base 203 is accordingly flat too, thus that the outer surface of the fixing base 203 is in close contact with the inner surface of the splint 105. By being arranged in a flat shape and being close contact to each other, the tightness between the first electrical connecting structure 10 and the second electrical connecting structure 20 can be well improved, and the volume of the connector 1 can be reduced.

Referring to FIG. 3 again, the adapter board 101 is provided with a contact circuit 1011 electrically connected to the conductive member 201. The contact circuit 1011 is an open semi-circular arc structure or a closed annular structure, that is, the structure thereof includes arc-shaped forms. In order to facilitate the rotational connection, the adapter board 101 also includes structures of arc-shaped forms. The arc structure may be a circle, a semicircle or other arc structures, which makes the rotation angle thereof can reach at least 180 degrees.

The adapter board 101 includes two opposite main surfaces, the contact circuit 1011 is disposed on at least one of the main surfaces, and the number of the contact circuit 1011 on each of the main surfaces is at least one. When the number thereof is greater than or equal to 2, the contact circuits 1011 on the same main surface are arranged in the form of concentric rings with the center of the adapter board 101 as the center thereof. Corresponding conductive members 201 are oppositely disposed on one side or both sides of the clamping groove 2031.

Optionally, the angle of the central angle corresponding to the arc length of the contact circuit 1011 is greater than 180 degrees and less than or equal to 360 degrees, so that the first electrical connecting structure 10 and the second electrical connecting structure 20 can be relatively rotated at least 180 degrees.

Optionally, the central angle corresponding to the specific arc length of the contact circuit 1011 is not limited, as long as the adapter board 101 can be normally electrically connected within a rotation range of 0 to 180 degrees. Of course, in some other embodiments, the rotation angle is not limited to 0 to 180 degrees.

In some specific embodiments, the adapter board 101 may be made of metal material, plastic material or glass fiber material. When the adapter board 101 is made of a metal material, the contact circuit 1011 can be formed thereon by electroplating a conductive material, and when the adapter board 101 is made of plastic material, the contact circuits 1011 can be formed thereon by melting a conductive material.

Figure 5:
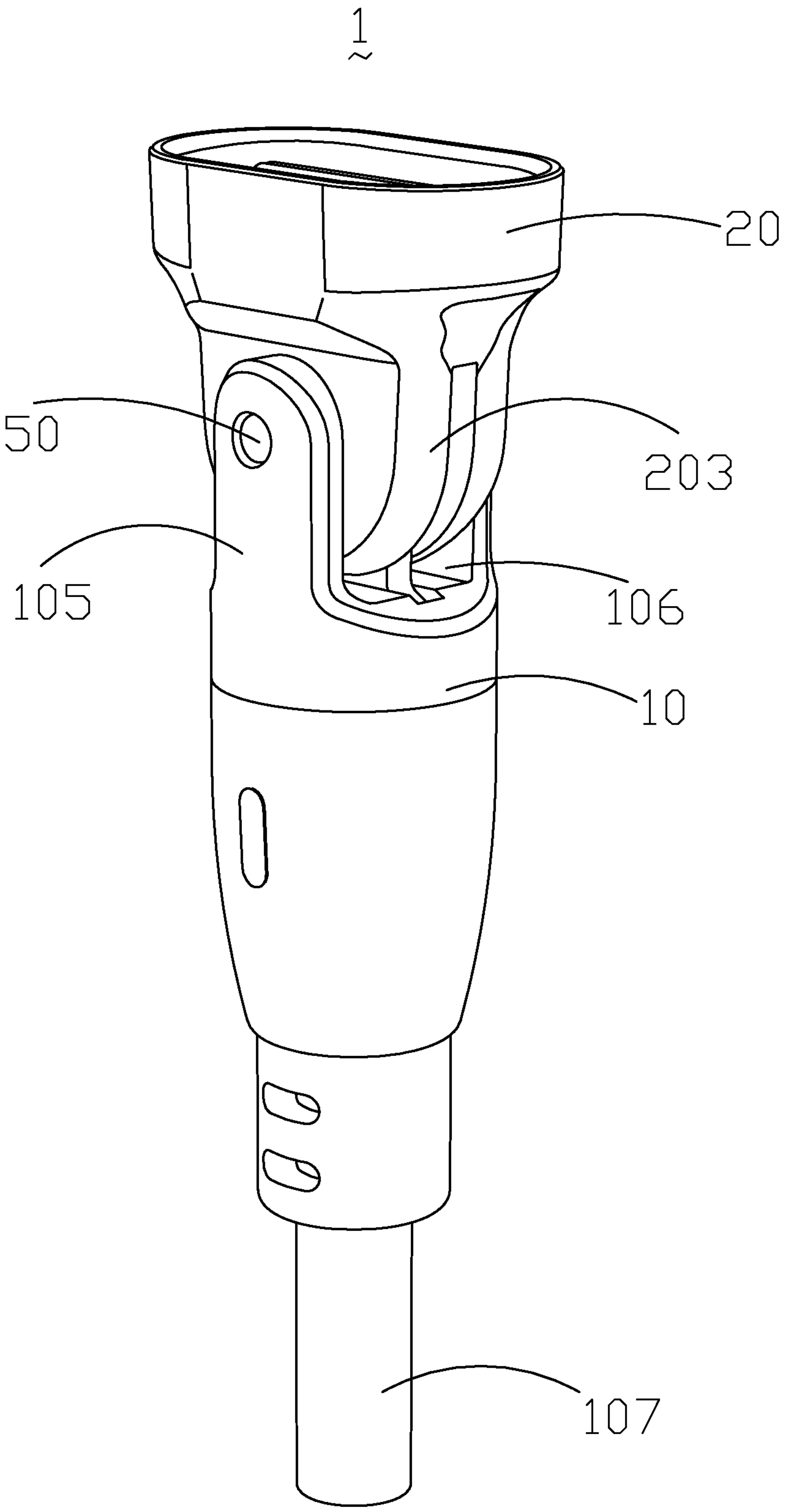
FIG. 5 is a perspective view of the first electrical connecting structure of the connector according to the first embodiment of the present disclosure when the first electrical connecting structure is connected to a wire body.
Figure 6:
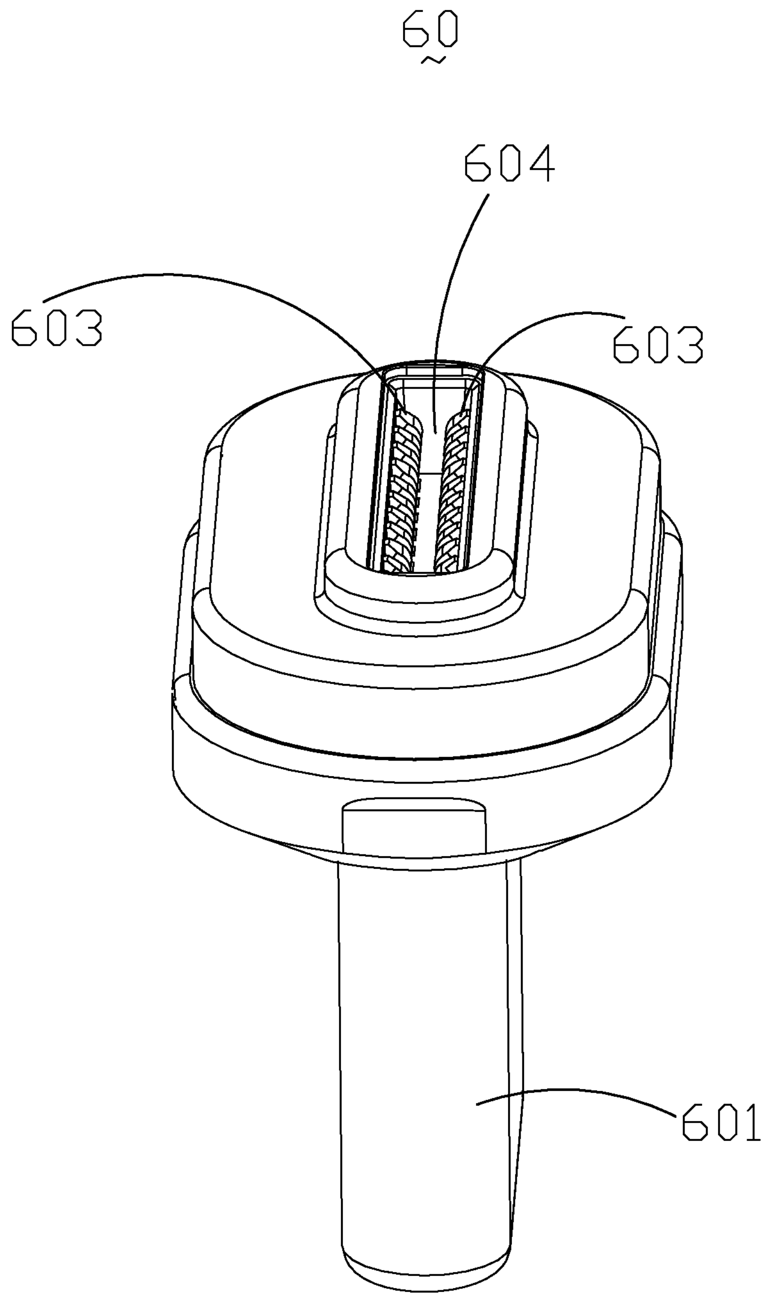
FIG. 6 is a perspective view diagram of a magnetic attraction plug.
Figure 7:
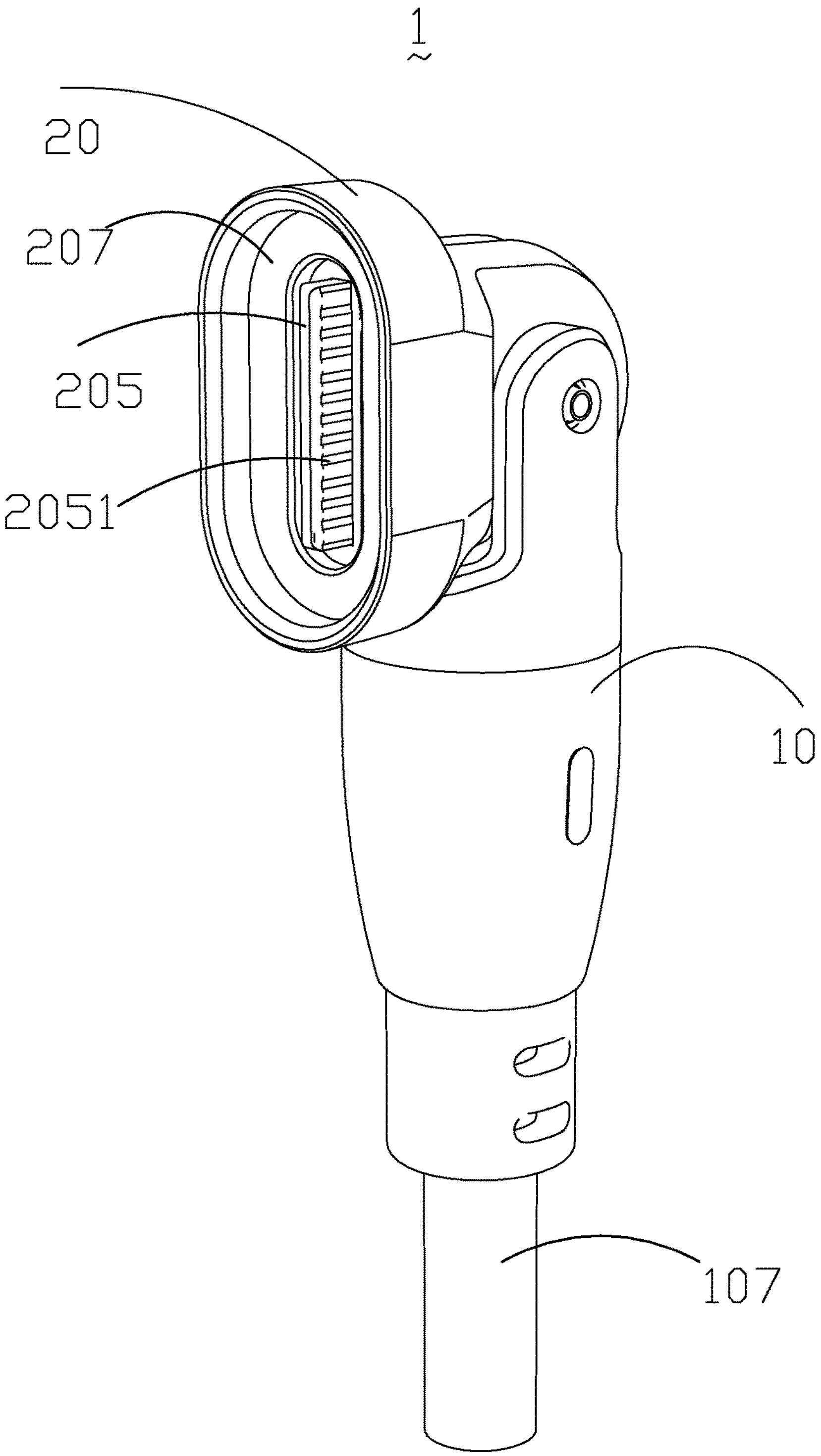
FIG. 7 is perspective view of the first electrical connecting structure of the connector according to the first embodiment of the present disclosure which is connected to a wire body.

Referring to FIG. 5, FIG. 6 and FIG. 7, in some specific embodiments, the first electrical connecting structure 10 is used to connect with a wire body 107, and the second electrical connecting structure 20 is a magnetic attraction connector structure for magnetically connecting with a magnetic attraction plug 60. The magnetic attraction plug 60 includes a type-c plug, a lightning plug or a micro-usb plug. As shown in FIG. 6, the magnetic attraction plug 60 includes a plug-in connector 601 for inserting into an electronic device and two rows of conductive pins 603, and a plug-in cavity 604 is formed between the two rows of conductive pins 603. The magnetic attraction connector structure of the second electrical connecting structure 20 is a plug-in structure, including a plug board 205 located at one end of the second electrical connecting structure 20 away from the first electrical connecting structure 10, and conductive elements 2051 are provided on both sides thereof. The conductive elements 2051 are electrically connected to the conductive member 201. A magnetic member 207 to be magnetically connected to the magnetic attraction plug 60 is disposed on outer side of the plug board 205, and the shape of the magnetic member 207 is annular.

Figure 8:
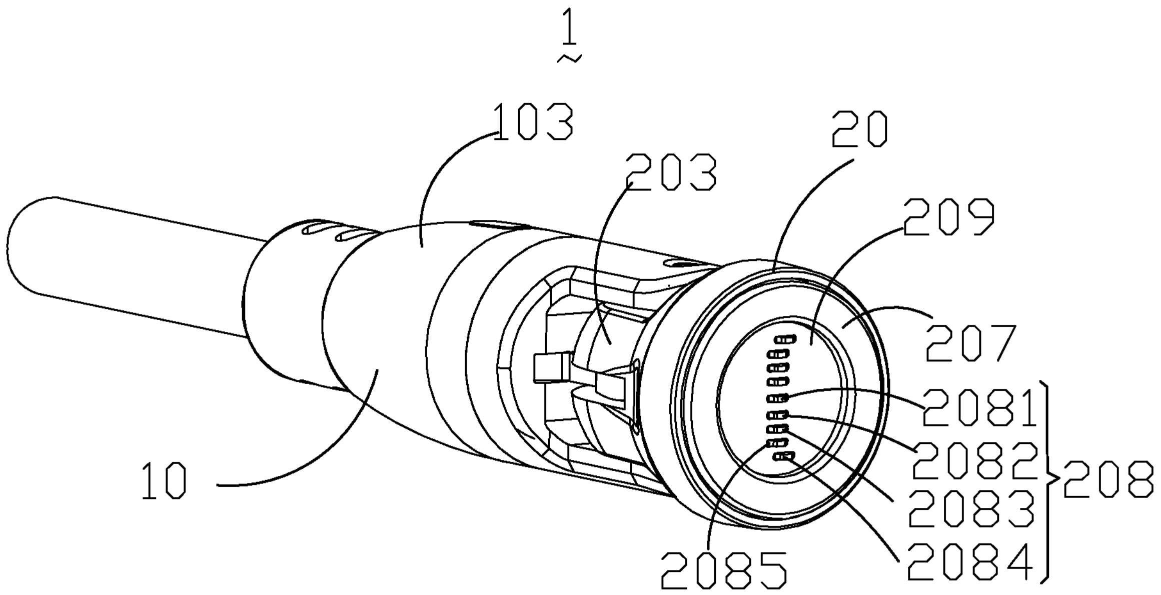
FIG. 8 is a perspective view of the second electrical connecting structure of the connector according to the first embodiment of the present disclosure which is a annular magnetic attraction connector.
Figure 9:
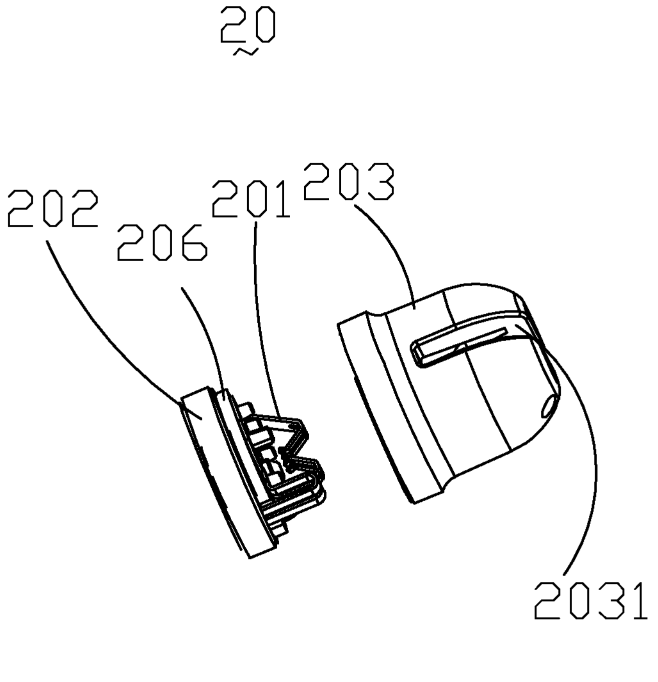
FIG. 9 is an exploded schematic diagram of the second electrical connecting structure of the connector according to the first embodiment of the present disclosure.

Referring to FIG. 8 and FIG. 9, the second electrical connecting structure 20 is another form of a magnetic connecting structure. The second electrical connecting structure 20 further includes a PCB board 206, a magnetic member 207, a plurality of top pins 208 and an insulating member 209. The PCB board 206 is disposed at one end away from the fixing base 203. The magnetic member 207 is disposed on outer side of the top pins 208 and has a ring-shaped structure. The insulating member 209 fixes the top pins 208 and insulates each top pin 208 from each other, and the insulating member 209 also insulates the top pins 208 from the magnetic member 207 meanwhile.

The number of the top pins 208 is 9, including a first top pin 2081, two second top pins 2082, two third top pins 2083, two fourth top pins 2084 and two fifth top pins 2085. The second top pin 2082, the third top pin 2083, the fourth top pin 2084 and the fifth top pin 2085 are respectively and symmetrically disposed on both sides of the first top pin 2081. The electrical signals of the first top pin 2081, the second top pins 2082, the third top pins 2083, the fourth top pins 2084, the fifth top pins 2085 and the magnetic member 207 are defined as "D−", "CC2", "V+", "D+", "G" and "CC1". The signal definition of each top pin 208 and the magnetic member 207 may also be in other forms. For example, the electrical signals of the first top pin 2081, the second top pins 2082, the third top pins 2083, the fourth top pins 2084, the fifth top pins 2085 and the magnetic member 207 are defined as "D−", "CC1", "V+", "D+"", "G" and "CC2".

In some other embodiments, the number of the top pins 208 may also be other values. For example, the number of the top pin is one, wherein the electrical signals are defined as "V+", and the magnetic element 207 is correspondingly defined as "V−"; or two, wherein the electrical signals are defined as "V−" and "V+"; or three, wherein the electrical signals are defined as "D−", "D+" and "V+", and the magnetic element 207 is correspondingly defined as "V−". It should be noted that, in order to realize the charging function, at least one top pin is needed, and in this case, the magnetic member 207 needs to be used as an electrical transmission component. At least three or four top pins is needed to be disposed to realize the functions of charging and data transmission. When three top pins are provided, the magnetic member 207 needs to be used as an electrical transmission component. In order to realize more charging functions, such as the fast charging function, more than 3 or 4 top pins are required, which will not be listed here.

Figure 10:
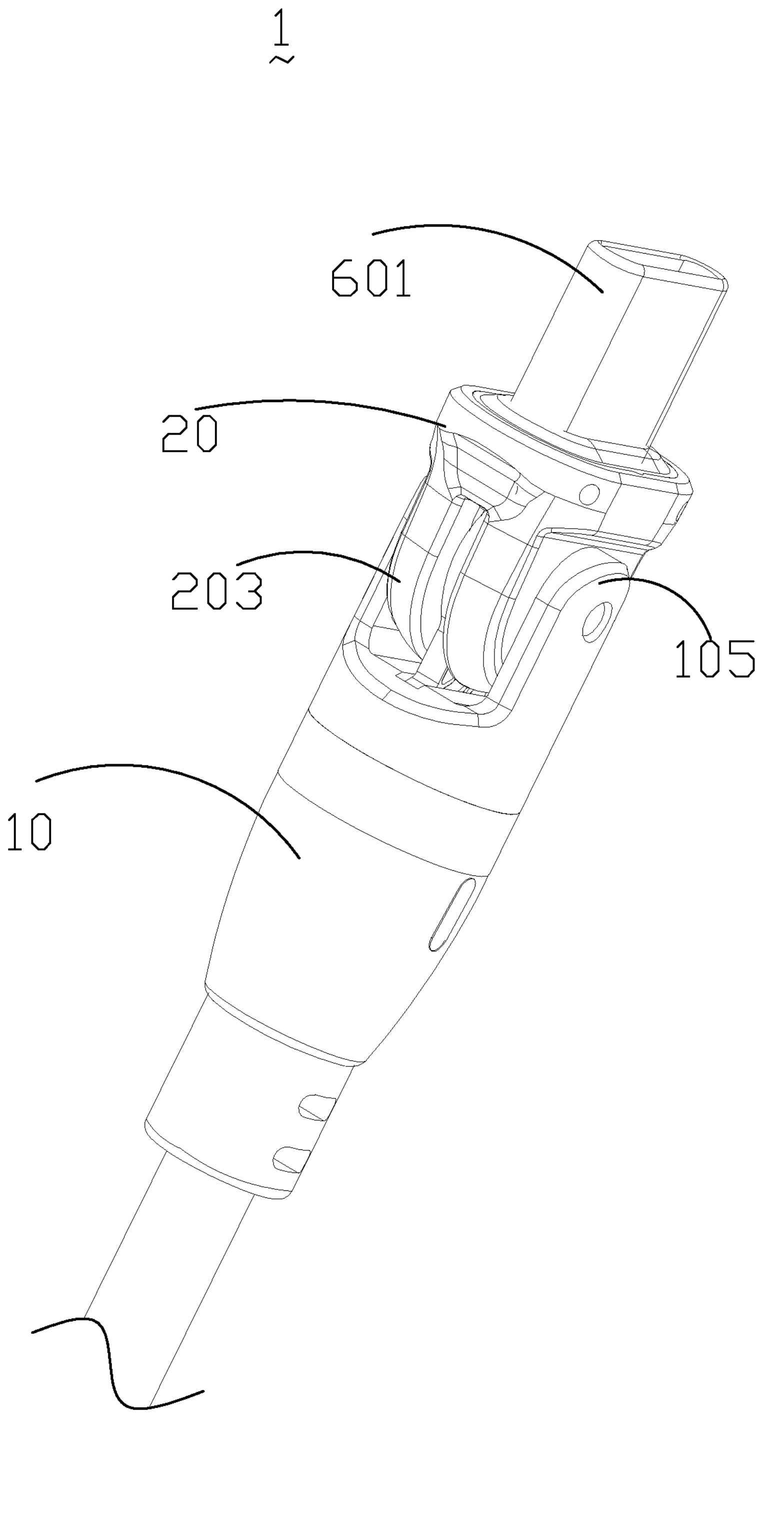
FIG. 10 is a perspective view of the second electrical connecting structure of the connector according to the first embodiment of the present disclosure which is a fixed connector structure.

Referring to FIG. 9 and FIG. 10, in another embodiment, the second electrical connecting structure 20 is a fixed connector, which includes a plug-in connector 601 at one end away from the fixing base 203 for inserting an electronic device, and the plug-in connector 601 is electrically connected to the conductive member 201.

Figure 11:
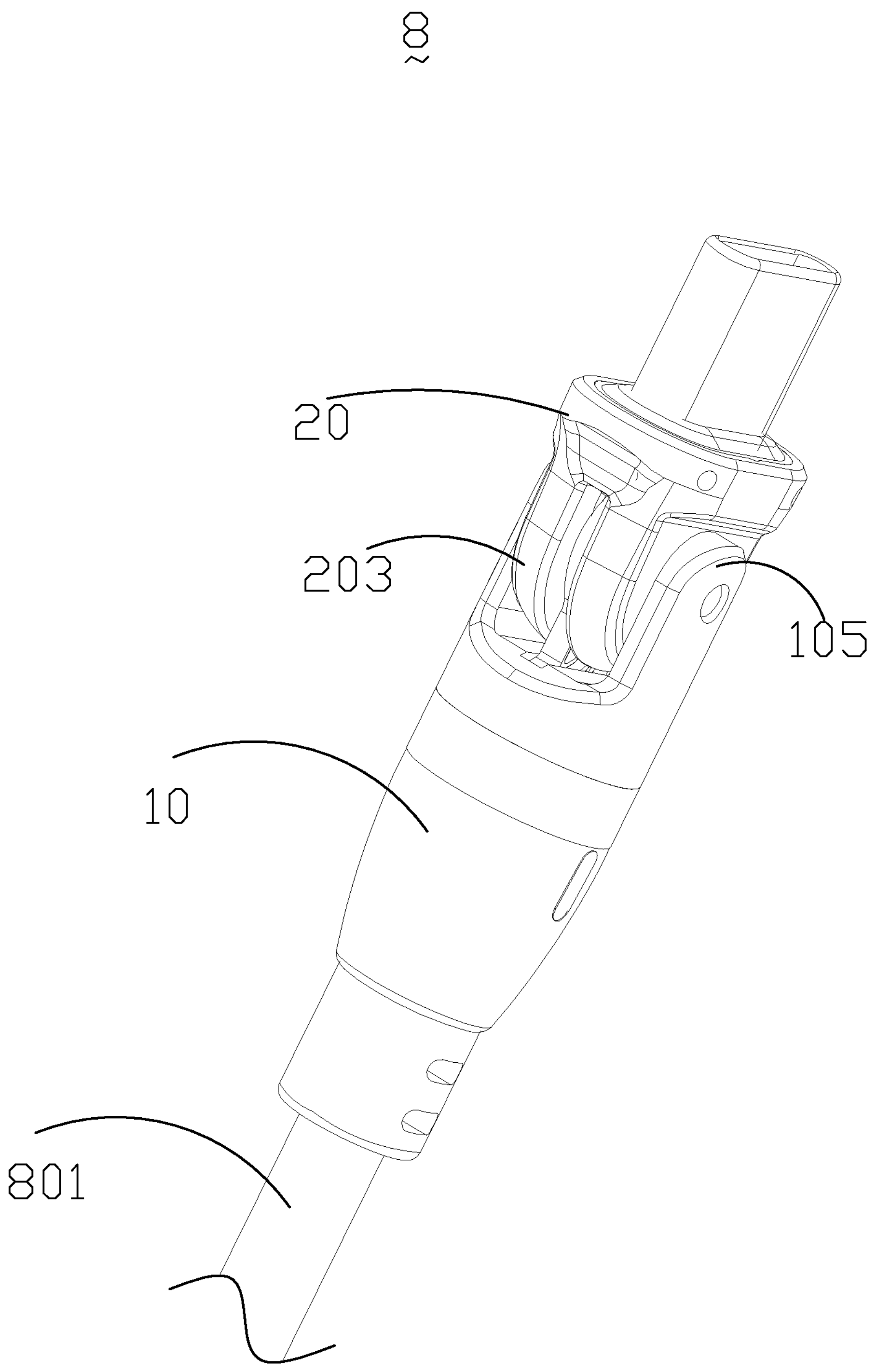
FIG. 11 is a perspective view of a data wire according to a second embodiment of the present disclosure.

Referring to FIG. 11, a second embodiment of the present disclosure provides a data wire 8. The data wire 8 includes the connector 1 of the first embodiment and a wire body 801, and the wire body 801 is electrically connected to one or both of the first electrical connecting structure 10 and the second electrical connecting structure 20. When the wire body 801 is electrically connected to one of the first electrical connecting structure 10 and the second electrical connecting structure 20, the other one is a fixed connector structure or a magnetic attraction connector structure.

Figure 12:
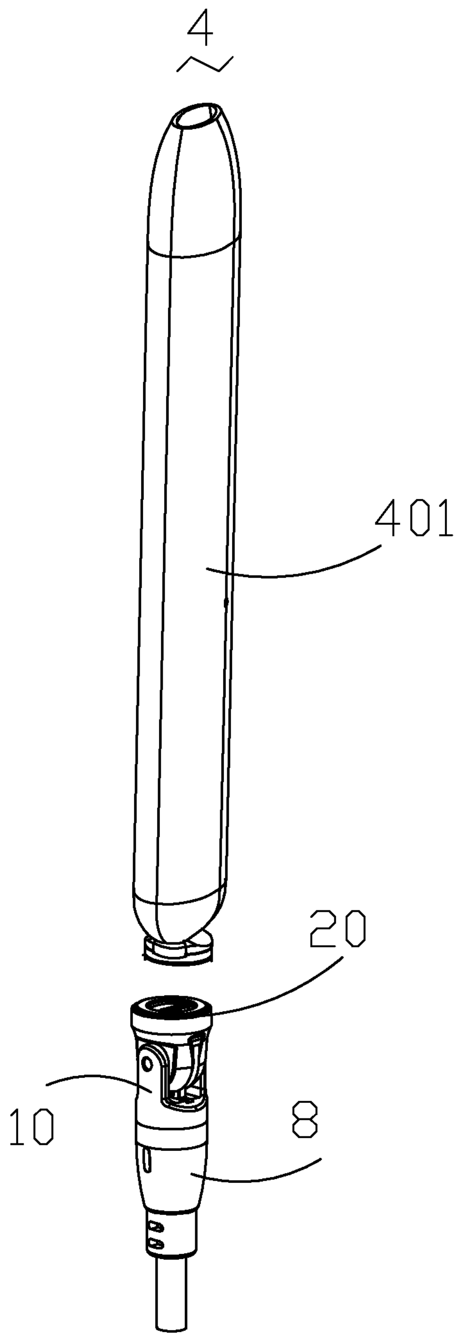
FIG. 12 is a perspective view of an electronic device according to a third embodiment of the present disclosure when the main body of the electronic device is an electronic cigarette.
Figure 13:
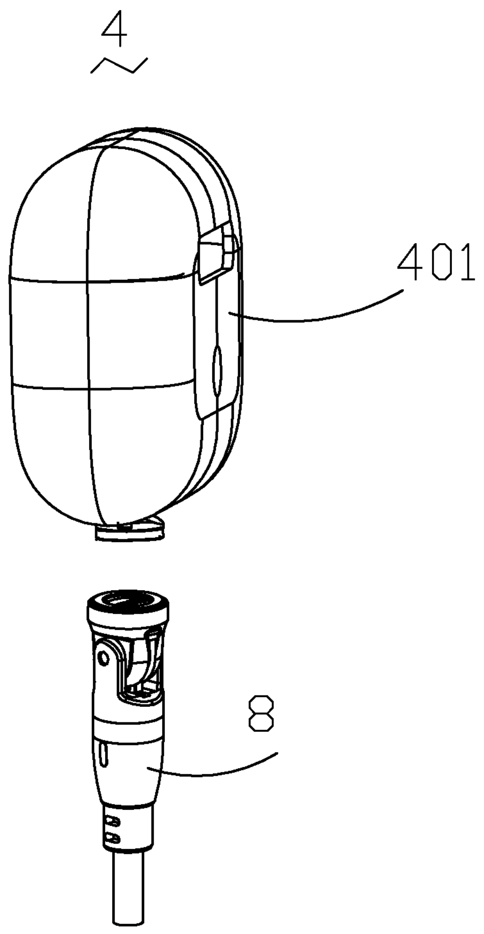
FIG. 13 is a perspective view of the electronic device according to the third embodiment of the present disclosure when the main body of the electronic device is a TWS earphone.

Referring to FIG. 12 and FIG. 13, a third embodiment of the present disclosure provides an electronic device 4, including the data wire 8 of the second embodiment and a main body 401 electrically connected to the data wire 8. The main body 401 of the electronic device 4 may include an electronic cigarette (as shown in FIG. 12), a TWS earphone (as shown in FIG. 13), a mobile phone, and the like. Specifically, the main body 401 of the electronic device 4 is magnetically connected to the second electrical connecting structure 20.

Compared with the prior art, the connector, the data wire and the electronic device of the present disclosure have the following beneficial effects.

A connector, the connector includes a first electrical connecting structure and a second electrical connecting structure. The first electrical connecting structure includes a connecting base and an adapter board disposed thereon. The second electrical connecting structure includes a fixing base and a conductive member. The fixing base forms a clamping groove for the adapter board to be inserted into. The conductive member is fixed in the fixing base and exposed from the clamping groove to be electrically connected to the adapter board. The connecting base further includes a splint which includes portions respectively disposed on both sides of the adapter board in the thickness direction thereof. The first electrical connecting structure and the second electrical connecting structure are rotatably connected. The splint is disposed on both sides of the adapter board in the thickness direction to protect the adapter board, so that the first electrical connecting structure and the second electrical connecting structure are rotatably connected, when subjected to a force along the thickness direction of the adapter board, the dislocation and deflection of the adapter board along the thickness direction can be avoided, and reduce the risk of the adapter board being broken.

The splint is provided in two pieces, which are oppositely disposed on both sides of the adapter board in the thickness direction thereof. The two pieces of the splint form a discontinuous gap for the second electrical connecting structure to be rotatably connected. The splint and the adapter board form a cavity for accommodating the fixing base, a portion of the cavity is formed between the splint and the adapter board, and the portions of the fixing base on both sides of the clamping groove are respectively accommodated in the corresponding cavity, forming a clamping structure in which the fixing base is clamped between the two pieces of the splint. Thus the splint can well protect the adapter board, and can well reduce the risk of the adapter board being broken when subjected to a force along the thickness direction thereof. Meanwhile, the splint is added to be disposed on outer side of the fixing base, and the two are connected through the connecting shaft, so that the outer side of the adapter board is the structure of the fixing base and the splint in sequence, which enhances the connection strength between the first electrical connecting structure and the second electrical connecting structure and improves the lifetime.

The adapter board and the fixing base are arranged in a flat shape and in close contact with each other, which can improve the tightness of the first electrical connecting structure and the second electrical connecting structure and reduce the volume of the connector.

One of the first electrical connecting structure and the second electrical connecting structure is used for connecting with the wire body, and the other is a magnetic attraction connector structure or a fixed connector structure. Or, both the first electrical connecting structure and the second electrical connecting structure are used to connect with the wire body. Or, the first electrical connecting structure and the second electrical connecting structure are one or both of a magnetic attraction connector structure or a fixed connector structure, which diversifies the connector to meet the needs of different practical scenarios.

The data wire and the electronic device of the present disclosure have the same beneficial effects as the connector.

The foregoing descriptions are only preferred embodiments of the present disclosure, and should not be construed as limiting the scope of the disclosure. Any modifications, equivalent replacements and improvements made within the principles of the present disclosure should be included within the protection scope of the present disclosure.

The invention claimed is:

1. A connector assembly comprises a first electrical connecting structure and a second electrical connecting structure rotatably connected thereto, the first electrical connecting structure comprising a connecting base and an adapter board disposed thereon;

the second electrical connecting structure comprising a fixing base and a conductive member, the fixing base defining a clamping groove for inserting the adapter board therein, the conductive member being fixed in the fixing base and exposed from the clamping groove for electrically connecting with the adapter board;

the connecting base further comprising a splint which comprising portions respectively disposed on both sides of the adapter board in the thickness direction thereof.

2. The connector assembly according to claim 1, wherein the connector assembly further comprises a connecting shaft, the connecting shaft connecting the splint and the fixing base on one side and connecting the splint and the fixing base on the other side;

or the connecting shaft connecting the fixing base and the adapter board;

or the connecting shaft connecting the splint on both sides, the fixing base and the adapter board;

the first electrical connecting structure and the second electrical connecting structure being rotatably connected via the connecting shaft.

3. The connector assembly according to claim 2, wherein the connecting shaft passes through the fixing base and the adapter board and connects to the splint on two sides of the fixing base.

4. The connector assembly according to claim 1, wherein the splint is provided in two pieces, which are oppositely disposed on both sides of the adapter board in the thickness direction thereof, the two pieces of splints form a discontinuous gap for the second electrical connecting structure to be rotatably connected, the two pieces of splints and the adapter board form a cavity communicating with the gap for accommodating the fixing base.

5. The connector assembly according to claim 4, wherein the fixing base comprises a first fixing base and a second fixing base located on two sides of the clamping groove, the cavity comprises a first cavity located between one splint and the adapter board and a second cavity located between the other splint and the adapter board for respectively accommodating the first fixing base and the second fixing base.

6. The connector assembly according to claim 1, wherein the outer surface of the fixing base facing the splint is flat, the inner surface of the splint facing the fixing base is accordingly flat, the outer surface of the fixing base is in close contact with the inner surface of the splints.

7. The connector assembly according to claim 1, wherein a contact circuit is provided on the adapter board, the contact circuit and the adapter board respectively comprise arc structures, the conductive member is rotatably connected to the contact circuit.

8. The connector assembly according to claim 1, wherein the rotation angle of the first electrical connecting structure and the second electrical connecting structure ranges from 0 to 180 degrees.

9. The connector assembly according to claim 7, wherein the conductive member is disposed on opposite sides of the clamping groove, the contact circuit is disposed on opposite surfaces of the adapter board.

10. The connector according to claim 1, wherein one of the first electrical connecting structure and the second electrical connecting structure is used for connecting with a wire body, and the other is a magnetic attraction connector structure or a fixed connector structure; or, both of the first electrical connecting structure and the second electrical connecting structure are used to connect with the wire body; or, the first electrical connecting structure and the second electrical connecting structure are one or both of a magnetic attraction connector structure or a fixed connector structure.

11. The connector assembly according to claim 1, wherein the first electrical connecting structure is used for electrically connecting with a wire body, the second electrical connecting structure is a magnetic attraction connector structure, the second electrical connecting structure further comprises top pins electrically connected to the conductive member and an annular magnetic member disposed on outer side of the top pins.

12. The connector assembly according to claim 11, wherein the number of the top pins is 9, comprising a first top pin, two second top pins, two third top pins, two fourth top pins and two fifth top pins, and the second top pins, the third top pins, the fourth top pins and the fifth top pins are respectively and symmetrically disposed on both sides of the first top pin.

13. The connector assembly according to claim 12, wherein the electrical signal of the magnetic member is defined as the "CC1" fast charge signal, and the electrical signals of the first top pin, the second top pins, the third top pins, the fourth top pins and the fifth top pins are respectively defined as "D−", "CC2", "V+", "D+" and "G"; or the electrical signal of the magnetic member is defined as the "CC2" fast charge signal, and the electrical signals of the first top pin, the second top pins, the third top pins, the fourth top pins and the fifth top pins are respectively defined as "D−", "CC1", "V+", "D+" and "G".

14. The connector according to claim 1, wherein the first connecting structure is used for electrically connecting with a wire body, the second electrical connecting structure is a magnetic attraction connector structure, the second electrical connecting structure further comprising conductive pins, a plug board, and an annular magnetic member disposed on outer side of the plug board, the conductive pins being disposed on both sides of the plug board and electrically connected with the conductive member.

15. A data wire, wherein the data wire comprises a wire body and the connector according to claim 1, the wire body is electrically connected to one or both of the first electrical connecting structure and the second electrical connecting structure.

16. An electronic device, wherein the electronic device comprises a main body and the data wire according to claim 15, the main body being electrically connected to the data wire.

* * * * *